Patented July 26, 1949

2,477,480

UNITED STATES PATENT OFFICE 2,477,480

ANTIMALARIAL COMPOUNDS AND PROCESS OF MAKING THEM

Robert C. Elderfield, Hastings on Hudson, and James D. Head, New York, N. Y., assignors to the United States of America as represented by the Secretary of War No Drawing. Application April 8, 1946, Serial No. 660,416

7 Claims. (Cl. 260—286)

This invention relates to certain new antimalarials and to a process for preparing them.

The new antimalarials are 6-methoxy-8-substituted quinolines represented by the following formula:

(1) 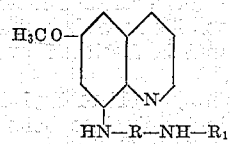

in which R represents a methyl or ethyl substituted tetra- or penta-methylene radical, and $R_1$ represents an alkyl radical having from 1 to 6 carbon atoms; and their salts. Thus, R may be a methyl substituted butyl radical such as 1-methylbutyl, an ethyl substituted butyl radical such as 4-ethylbutyl, a methyl substituted pentyl radical such as 1-methylpentyl, or an ethyl substituted pentyl radical. Examples of the $R_1$ radicals include methyl, ethyl, propyl, isopropyl, and the several butyl, pentyl, and hexyl radicals.

These new substituted quinolines have antimalarial action which appears to be favorable in comparison with plasmoquin and when used in conjunction with quinine to have curative value in human Pl. vivax malaria.

The new substituted quinolines may be prepared by condensing 6-methoxy-8-aminoquinoline with a hydrohalide of an alkylaminoalkyl halide of the following formula (2) 

in which R and $R_1$ have the same meaning as in Formula 1, and Ha represents one of the halogens chlorine and bromine and is preferably bromine. This condensation is desirably carried out by mixing in warm water one molecular proportion of the alkyl-aminoalkyl bromide hydrobromide with two molecular proportions of 6-methoxy-8-aminoquinoline, the extra mole of the quinoline being present as a buffer. The mixture is held within a few degrees of 45° C. for 12 to 14 hours, and the temperature is then progressively raised and finally held at 95–100° C. for 5 to 6 hours. The mixture is then poured into cold water and made alkaline, as with sodium or potassium hydroxide solution, which liberates as a free base the desired 6-methoxy-8-substituted quinoline. This is separated by extraction with ether; and may be purified by extracting the ether solution with an aqueous acetic acid-sodium acetate buffer solution, and recovering the desired substituted quinoline from the buffer solution by making it alkaline and extracting with ether. The final ether solution is distilled in an inert atmosphere at a pressure of less than about 1.5 mm. pressure and a bath temperature of about 225–250° C., to yield the desired free base.

The 6-methoxy-8-substituted quinolines may be characterized in the form of their oxalates. It is noted that oxalic acid does not always unite in stoichiometric ratio with the organic base, and that the characterization may be carried out by determining the percentages of base and oxalic acid in the salts, and calculating the carbon and hydrogen figures from these values. The 6-methoxy-8-substituted quinoline bases are somewhat unstable, and are desirably converted to their salts, for example the hydrohalides, the phosphates, the citrates, etc.

The following are examples of the invention:

Example 1

6-methoxy-8-(1'-methyl-4'-ethylaminobutylamino)-quinoline represented by the following formula (3) 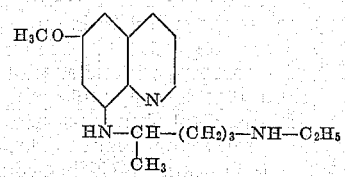

may be prepared as follows:

1-methyl-4-ethylaminobutyl bromide hydrobromide and certain other hydrobromides correspondingly used in Examples 4, 5, 6, and 7, are described by Elderfield and Brody, in their co-pending application Serial No. 660,413 filed April 8, 1946, now Patent No. 2,464,199, and in the paper of Elderfield et al., J. Am. Chem. Soc., 68, pages 1579–1584 (1946).

A mixture of 275 g. of 1-methyl-4-ethylaminobutyl bromide hydrobromide, 300 ml. of warm (40–50° C.) water and 348 g. (2 mol) of 6-methoxy-8-aminoquinoline is held to within a few degrees of 45° C., with stirring, for a period of 12–14 hours. The temperature is then increased to 60° C. for 1 hour, then to 70° C. for 1 hour, and finally to 95–100° C. for 5 to 6 hours. The hot reaction mixture is then poured into 1 liter of cold water and treated with 1 liter of 40 percent potassium hydroxide solution. The resulting mixture is extracted at room temperature first with 500 ml. of ether, and then twice with 200 ml. portions of ether. The ether extracts are combined and extracted with a buffer solution prepared by adding sodium acetate to a 10 percent solution of acetic acid until the solution is neutral or very slightly basic when tested on Congo red paper. This buffer extraction is desirably first with a 500 ml. portion, then with successively 100 ml. portions until no strong coloration of the aqueous solution is observed. The combined buffer extracts are then extracted with ether, desirably in three 100 ml. portions, and then combined with an equal volume of 40 percent aqueous potassium hydroxide. From the resulting aqueous solution, the substituted quinoline base is removed by extraction with ether, desirably successively with a 300 ml. portion and two 100 ml. portions, the combined ether extracts are dried as over magnesium sulfate, and filtered. The ether extract is then concentrated on a steam bath, and the residue is distilled, first at a temperature of about 150° C. under partial vacuum, and then at a pressure of less than 0.5 mm. in an inert atmosphere such as nitrogen. This yields the desired 6-methoxy-8-(1'-methyl - 4' - ethylaminobutylamino)-quinoline, which boils at 185–190° C. at 0.4 mm. pressure. It forms an oxalate melting at 175–178° C.

Example 2

6-methoxy - 8 - (1'-methyl-5'-isopropylaminopentylamino)-quinoline represented by the following formula

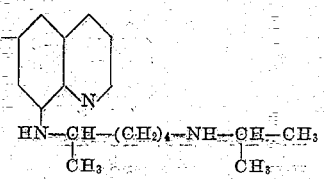

may be prepared by the procedure of Example 1, save that instead of 1-methyl-4-ethylaminobutyl bromide hydrobromide, the hydrobromide of 1-methyl-5-isopropylaminopentyl bromide is used. This latter may be prepared as follows: The sodium derivative of acetoacetic ester is reacted with trimethylene bromide and the resulting condensation product is subjected to ketonic hydrolysis to obtain 1-bromohexanone-5. This hexanone is reduced to the corresponding hexanol by reduction with aluminum isopropoxide in isopropanol solution. The hexanol thus obtained is reacted with isopropylamine for about 6 days at room temperature, to obtain 1-(N-isopropylamino)-hexanol-5. This aminohexanol is converted to 1-methyl-5-isopropylaminopentyl bromide hydrobromide by treating a cold benzene solution of the aminohexanol with thionyl bromide. The 1-methyl-5-isopropylaminopentyl bromide hydrobromide precipitates as a solid, which after recrystallization from a mixture of acetone and ether melts at 142–143.4° C.

Example 3

6-methoxy-8-(4'-ethyl - 4' - ethylaminobutylamino)-quinoline represented by the following formula

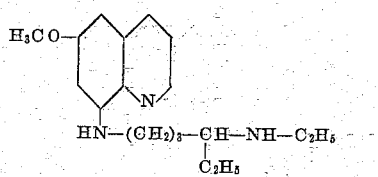

may be prepared by the procedure of Example 1, save that instead of the hydrobromide there used, the hydrobromide of 4-ethyl-4-ethylaminobutyl bromide is used. This latter compound is described in the said copending application Serial No. 660,413, and in the Elderfield et al. publication J. Am. Chem. Soc., 68, pages 1579–1584 (1946).

The 6-methoxy-8-(4'-ethyl-4'-ethylaminobutylamino)-quinoline boils at 167–169° C. at 0.1 mm. pressure, and forms a mono-oxalate which melts at 184–186° C.

Example 4

6-methoxy-8-(1'-methyl - 4' - isopropylaminobutylamino)-quinoline may be prepared by the procedure of Example 1, save that instead of the hydrobromide there used, 1-methyl-4-isopropylaminobutyl bromide hydrobromide is used. This latter compound is disclosed by Elderfield and Brody, supra.

The 6-methoxy-8-(1'-methyl-4'-isopropylaminobutylamino)-quinoline boils at 175–178° C. at 0.2 mm. pressure. It forms an oxalate melting at 133–136° C.

Example 5

6-methoxy-8-(1'-methyl - 4' - n-propylaminobutylamino)-quinoline may be prepared by the procedure of Example 1, save that instead of the hydrobromide there used, 1-methyl-4-n-propylaminobutyl bromide hydrobromide is used. This latter compound is disclosed by Elderfield and Brody, supra.

The 6-methoxy-8-(1'-methyl-4'-n - propylaminobutylamino)-quinoline boils at 175–178° C. at 0.2 mm. pressure. It forms an oxalate melting at 165–167° C.

Example 6

6-methoxy-8-(1'-methyl - 4' - isobutylaminobutylamino)-quinoline may be prepared by the procedure of Example 1, save that instead of the hydrobromide there used, 1-methyl-4-isobutylaminobutyl bromide hydrobromide is used. This latter compound is disclosed by Elderfield and Brody, supra.

The 6-methoxy-8-(1'-methyl-4' - isobutylaminobutylamino)-quinoline boils at 180–184° C. at 0.3 mm. pressure. It forms an oxalate melting at 169–173° C.

Example 7

6-methoxy-8-(1'-methyl - 4' - tert.butylaminobutylamino)-quinoline may be prepared by the procedure of Example 1, save that instead of the hydrobromide there used, 1-methyl-4-tert.-butylaminobutyl bromide hydrobromide is used. This latter compound is disclosed by Elderfield and Brody supra.

The 6-methoxy-8-(1'-methyl - 4' - tert.butylaminobutylamino)-quinoline boils at 180–185° C. at 0.3 mm. pressure. It forms an oxalate melting at 140–145° C.

Example 8

Any of the preceding examples may be repeated, save that hydrobromides of other alkylaminoalkyl bromides of Formula 2 are used, to produce other 6-methoxy-8-substituted quinolines of Formula 1, and their salts.

We claim as our invention:

1. The new antimalarials of the class consisting of 6-methoxy-8-substituted quinolines represented by the following formula

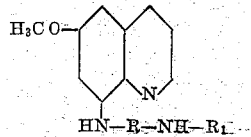

in which R is a polymethylene chain including a lower alkyl side chain and having from 4 to 5 carbon atoms, the said side chain being one of the radicals selected from the group consisting of methyl and ethyl, and $R_1$ is an alkyl radical having from 1 to 6 carbon atoms, and their salts.

2. The new antimalarials of the class consisting of 6-methoxy-8-substituted quinolines represented by the following formula

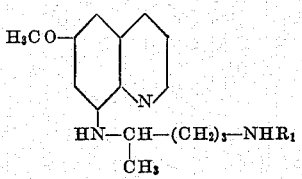

in which $R_1$ is an alkyl radical having from 1 to 6 carbon atoms, and their salts.

3. The new antimalarials of the class consisting of 6-methoxy-8-substituted quinolines represented by the following formula

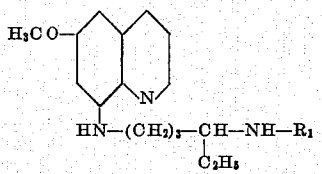

in which $R_1$ is an alkyl radical having from 1 to 6 carbon atoms, and their salts.

4. The new antimalarials of the class consisting of 6-methoxy-8-substituted quinolines represented by the following formula

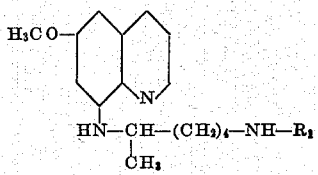

in which $R_1$ is an alkyl radical having from 1 to 6 carbon atoms, and their salts.

5. The process of preparing the new antimalarials having the formula

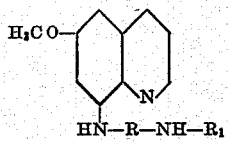

defined in claim 1 which comprises condensing 6-methoxy-8-aminoquinoline and the hydrobromide of an alkylaminoalkyl bromide of the following formula

in which R and $R_1$ have the same meaning as in claim 1.

6. The process of preparing the new antimalarials having the formula

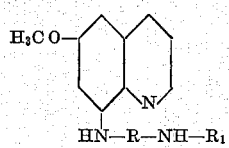

defined in claim 1 which comprises condensing 6-methoxy-8-aminoquinoline and the hydrobromide of an alkylaminoalkyl bromide of the following formula Br—R—NH—$R_1$ in which R and $R_1$ have the same meaning as in claim 1 in aqueous solution and in the presence of an extra molecular portion of 6-methoxy-8-aminoquinoline as a buffer.

7. The process of preparing the new antimalarials having the formula

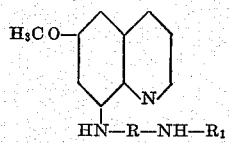

defined in claim 1 which comprises mixing 6-methoxy-8-aminoquinoline and the hydrobromide of an alkylaminoalkyl bromide of the following formula Br—R—NH—$R_1$ in which R and $R_1$ have the same meaning as in claim 1 in aqueous solution with an extra molecular portion of 6-methoxy-8-aminoquinoline as a buffer, maintaining the said mixture within a few degrees of 45° C. for a period of about 12 to 14 hours, then progressively raising the temperature to about 100° C. and maintaining it at that temperature for several hours.

ROBERT C. ELDERFIELD.
JAMES D. HEAD.

REFERENCES CITED

The following references are of record in the file of this patent:

UNITED STATES PATENTS

| Number | Name | Date |
|---|---|---|
| 1,938,047 | Schonhofer | Dec. 5, 1933 |

FOREIGN PATENTS

| Number | Country | Date |
|---|---|---|
| 486,079 | Germany | Dec. 2, 1929 |

OTHER REFERENCES

Shriner and Upson, "Synthetic Antimalarials" (published in Bloomington, Indiana, 1941), page 9. (Copy in Div. 59).